US012403791B2

(12) United States Patent
Allamsetty

(10) Patent No.: US 12,403,791 B2
(45) Date of Patent: Sep. 2, 2025

(54) WIRELESS NETWORK CONNECTIONS FOR ELECTRIC VEHICLE CHARGERS

(71) Applicant: Rivian IP Holdings, LLC, Irvine, CA (US)

(72) Inventor: Chakravarthy K. Allamsetty, San Jose, CA (US)

(73) Assignee: Rivian IP Holdings, LLC

( * ) Notice: Subject to any disclaimer, the term of this patent is extended or adjusted under 35 U.S.C. 154(b) by 750 days.

(21) Appl. No.: 17/825,395

(22) Filed: May 26, 2022

(65) Prior Publication Data

US 2023/0382259 A1 Nov. 30, 2023

(51) Int. Cl.
*B60L 53/66* (2019.01)
*B60L 53/126* (2019.01)
*B60L 53/30* (2019.01)
*B60L 53/65* (2019.01)
*B60L 53/68* (2019.01)

(52) U.S. Cl.
CPC ............. *B60L 53/66* (2019.02); *B60L 53/126* (2019.02); *B60L 53/305* (2019.02); *B60L 53/65* (2019.02); *B60L 53/68* (2019.02)

(58) Field of Classification Search
CPC ........ B60L 53/66; B60L 53/126; B60L 53/65; B60L 53/305; B60L 53/68; B60L 53/00; B60L 53/0092; B60L 53/31
See application file for complete search history.

(56) References Cited

U.S. PATENT DOCUMENTS

2024/0214805 A1\* 6/2024 Srinath Bharadwaj ...................... H04W 12/009

FOREIGN PATENT DOCUMENTS

CN 112866104 A \* 5/2021 ............. B60L 53/65
WO WO-2022170333 A1 \* 8/2022 ............ B60L 53/305

\* cited by examiner

*Primary Examiner* — David V Henze-Gongola
(74) *Attorney, Agent, or Firm* — FOLEY & LARDNER LLP

(57) ABSTRACT

Systems and methods including a charging station, with one or more processors coupled to memory. The charging station is configured to determine that a first network connection between the charging station and one or more servers is unavailable, detect an electric vehicle having a token within a threshold distance of the charging station, and establish, a second network connection between the charging station and the electric vehicle based the determination that the first network connection is unavailable and the detection of the electric vehicle within the threshold distance. The second channel is encrypted based at least in part on the token provided by the electric vehicle. The charging station is configured to transmit data collected by the charging station to cause the electric vehicle to provide the data to the one or more servers via the second network connection.

20 Claims, 8 Drawing Sheets

WIRELESS NETWORK CONNECTIONS FOR ELECTRIC VEHICLE CHARGERS

INTRODUCTION

A battery of an electric vehicle can be charged using electricity delivered from a power source. The charged battery can power the electric vehicle.

SUMMARY

Aspects of this technical solution can be directed to wireless network connections for electric vehicle chargers. For example, an electric vehicle charger can communicate with a server via a network. However, the network connection between the electric vehicle charger may become unavailable due to one or more factors. Upon detecting that the network is unavailable, the electric vehicle charger of this technical solution can determine than an electric vehicle having a different network connection is within proximity of the electric vehicle charger and establish a connection to the server via the electric vehicle and resume connectivity.

By resuming the connection to the server via the electric vehicle, the electric vehicle charger of this technical solution can continue to provide charging and other data to the server in the event that a first network connection between the electric vehicle or charging station lacks network connectivity with the charging station. The connection can cause data associated with a device lacking network connectivity with the server to establish a connection with another device, and cause the other device to convey data to the server. The conveyed data can be encrypted or otherwise secured.

At least one aspect is directed to a system including a charging station, with one or more processors coupled to memory. The charging station can determine that a first network connection between the charging station and one or more servers is unavailable. The charging station can detect an electric vehicle having a token within a threshold distance of the charging station. The charging station can establish a second network connection between the charging station and the electric vehicle based the determination that the first network connection is unavailable and the detection of the electric vehicle within the threshold distance. The second channel can be encrypted based at least in part on the token provided by the electric vehicle. The charging station can transmit data collected by the charging station to cause the electric vehicle to provide the data to the one or more servers via the second network connection.

At least one aspect is directed to a method. The method can be performed by one or more processors coupled with memory. The method can include the one or more processors determining that a first network connection between a charging station and one or more servers is unavailable. The method can include the one or more processors detecting an electric vehicle having a token within a threshold distance of the charging station, by the charging station. The method can include the one or more processors establishing, responsive to the determination that the first network connection is unavailable and the detection of the electric vehicle within the threshold distance, a second network connection between the charging station and the electric vehicle encrypted based at least in part on the token provided by the electric vehicle, by the charging station. The method can include the one or more processors transmitting, via the second network connection, data collected by the charging station to cause the electric vehicle to provide the data to the one or more servers.

At least one aspect is directed to a system including an electric vehicle, having one or more processors coupled to memory, and a first token. The electric vehicle can determine that a first network connection between the electric vehicle and one or more servers is unavailable. The electric vehicle can detect a charging station within a threshold distance of the electric vehicle. The electric vehicle can provide the first token to the charging station. The electric vehicle can establish, responsive to the determination that the first network connection is unavailable and the detection of the charging station within the threshold distance, a second network connection between the electric vehicle and the charging station. The second network connection can be encrypted based at least in part on the first token provided by the charging station. The electric vehicle can transmit, via the second network connection, data collected by the electric vehicle to cause (e.g., request, command, utilize) the charging station to provide the data to the one or more servers.

At least one aspect is directed to system including an electric vehicle having one or more processors coupled to memory to detect a charging station within a threshold distance of the electric vehicle. The one or more processors can establish a first network connection between the electric vehicle and the charging station that is encrypted. The first network connection can provide the charging station access to a backend server via a second network connection from the electric vehicle to the backend server. The one or more processors can receive, from the charging station, a request to conduct a file transfer from the backend server to the charging station via the second network connection. The request can include an indication of a duration of the file transfer. The one or more processors can display, responsive to the request, a prompt via a graphical user interface of the electric vehicle. The prompt can request authorization for the file transfer from the backend server to the charging station via the first network connection and the second network connection. The one or more processors can conduct the file transfer responsive to an interaction with the prompt.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
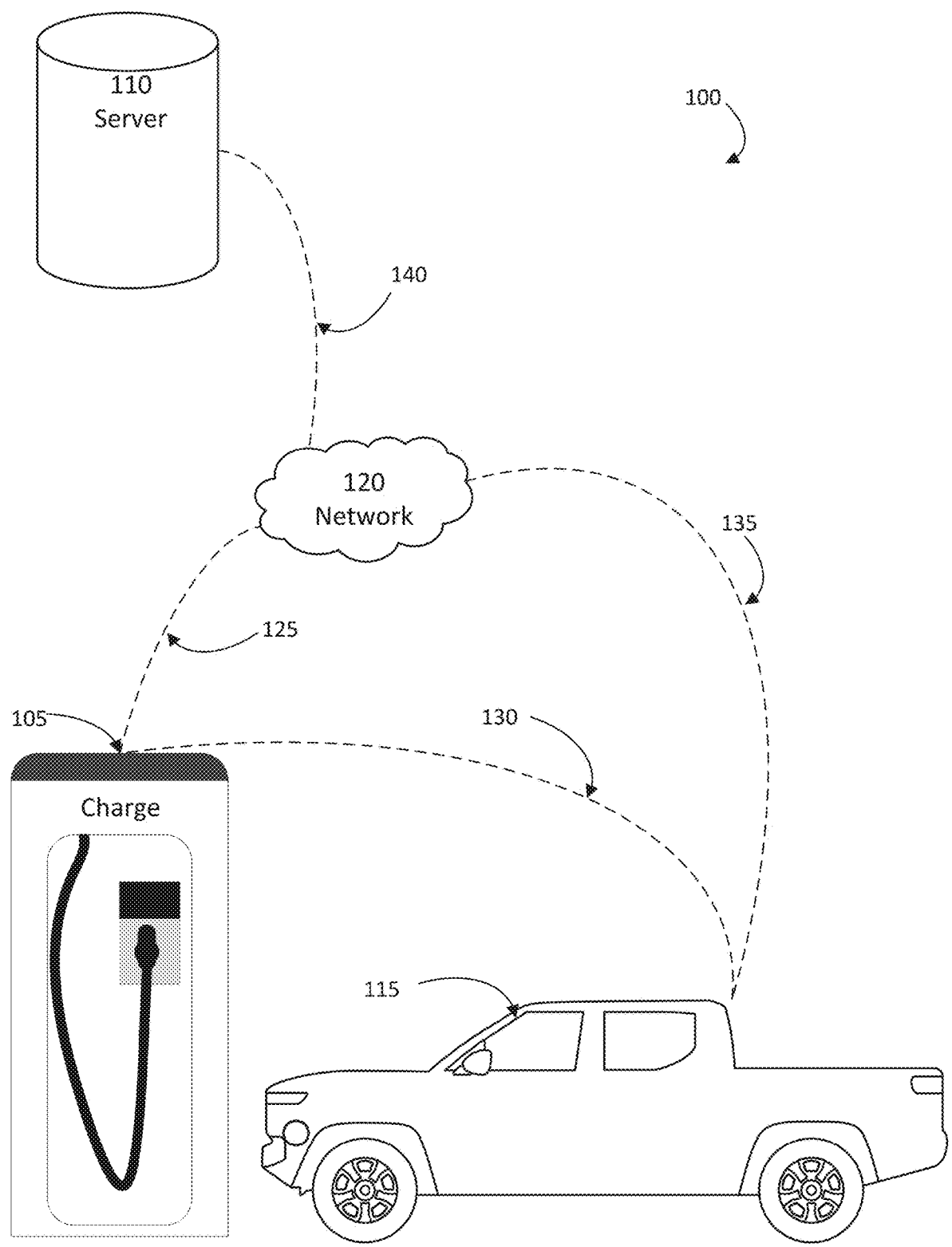
FIG. 1 depicts a system to provide wireless connection for electric vehicle chargers, in accordance with some aspects.

Following below are more detailed descriptions of various concepts related to, and implementations of, methods, apparatuses, and systems to provide wireless connection for electric vehicle chargers. The various concepts introduced above and discussed in greater detail below can be implemented in any of numerous ways.

The present disclosure is directed to systems and methods to provide wireless connection for electric vehicle chargers, which can enable connectivity to a server when one or more devices associated with a vehicle charging loses network connectivity. For example or more charging stations can be located proximal to one or more electric vehicles, and one or more mobile devices having a network connection. Various devices may need to convey information (e.g., software updates, log files, or transaction data, or other data). However, network connectivity of one or more devices can be unavailable, unsatisfactory, intermittent or absent. For example, network connectivity of a device can be associated with a first cellular network, and that cellular network can lack coverage at a time and place. Because each of the various devices can differ in position, transmission power, transmission network, antennae design, status, network configuration, modem status, or other parameters, one device can have connectivity when another device lacks connectivity. By conveying various network communication through additional devices, a network having increased availability can be established.

The disclosed solutions have a technical advantage of benefitting from improved reliability associated with redundant hardware and networks without including multiple transceivers, networks, or other components in a single device. For example, a cluster of four charging stations can be in proximity of four electric vehicles, and each user of each electric vehicle can have a mobile device having an application stored thereupon for communicating with said vehicles. Thus twelve wireless transceivers can be present, each being capable of communication over a network. If one or more device lose connectivity (e.g., due to a cellular network outage of a particular cellular network), network connectivity of those devices can be maintained through the additional transceivers. Moreover, the mobile nature of the electric vehicles and mobile devices can allow the later transmission of data, if network service is not available in a particular location.

Systems and methods of the present technical solution can include a charging station and an electric vehicle. Either of the charging station or the electric vehicle can determine that network connectivity to a server is absent. In response to the absence, the vehicle or charging station can, upon authorization, cause a wireless transceiver of a counterpart device to transmit data between the charging station and the server. This data can include charging data, software updates, log files, prognostics or analytics data or other data collected by either of the electric vehicle or the charging station.

FIG. 1 depicts a system 100 to provide wireless connection for electric vehicle chargers, in accordance with some aspects. The system 100 can include one or more charging stations 105. For example, the charging station 105 can be an electric vehicle charger. The charging station 105 can receive power from a regional power grid, a local power source (e.g., a battery or a local solar or wind array), or a mobile power source (e.g., the battery of an electric vehicle 115). The charging station 105 can be wired or wireless.

The charging station 105 can include a network connection 125 to one or more servers 110. For example, the charging station 105 can include a transceiver (e.g., modem) connected to the internet or another network 120, such as a cellular communications network, or satellite communications network. Some charging stations 105 include multiple network connections (e.g., Bluetooth, WiFi, cellular, Ethernet, etc.). The network connection 125 to the server 110 can use on various elements such as a SIM card configuration, physical and logical infrastructure, and satellite connectivity. The server 110 can also connect to local devices such as an electric vehicle 115 through an additional network connection 130. The local network connection can be by the same or a similar transceiver, or a different transceiver. The various network connections can be of similar or dissimilar protocols, antennae's, and priority. The various network connections can be operated alternatively or simultaneously. Additional devices including the electric vehicle 115 can be connected to the network 120 through a further connection 135, a server 110 can be connected to the network through a further connection 140. The further connection 140 can be a plurality of devices of a private or public network. The further connection can 140 connect the server 110 to the network or provide inter-server 110 connections such as one private LAN or a virtual network. For example, the further connection can be a tunnel between a firewall of a data center an the server. Additional network connections can be included in the system 100. For example, another network connection 130 between the charging station 105 and the electric vehicle 115 is depicted.

The charging station 105 can determine that the network connection to the server 110 has become unavailable. The loss in connectivity can be caused by the charging station 105, such as an unresponsive modem or damaged component. The loss in connectivity can also be caused by the server 110. For example, scheduled or unscheduled server downtime can render the charging station 105 unable to communicate with the server 110. Servers 110 can include redundancy or alternative backend nodes. A server 110 can send messages to the charging station 105 (e.g., directly addressed messages and broadcast messages) communicating downtime or other server 110 status information. Periodic watchdog or heartbeat indications can be exchanged to assess the state of the network connection between the server 110 and the charging station 105. These messages can be initiated by the server 110 or the charging station 105. These messages can be periodic or in response to a stimuli, including any stimulus or messaging available to the server 110 or the charging station 105. A lost connection can include a failure of the connection, or another indication. For example, a network can be operable at low bandwidth, high data cost, or having a packet loss in excess of a desired threshold. Such a network connection can be deemed unavailable. For example, if a network connection is required to upload a 2 gigabyte log file, and the network upload speed is determined to be 28 kbps, the network can be deemed unavailable.

The server 110 or the network 120 can contain additional divisions. For example, the charging stations 105 can be connected to a first network, and the vehicles can be connected to a second network, wherein the first and second networks form the depicted network 120. The server 110 can be similarly subdivided. The server 110 or the network 120 can include additional components such as filters, firewalls, and port forwarding to allow the networks to share data across the various subcomponents.

The charging station 105 can detect an electric vehicle 115 within a threshold distance. The detection of the vehicle can be by a wired or wireless device. The charging station 105 can include a motion detector to detect a vehicle. The charging station 105 can include a detection of inductive coupling to detect the presence of a vehicle. For example, a wireless charger can detect a vehicle based on a magnetic coupling of a coil between the wireless charger and an electric vehicle 115, or a detector can communicate a near field communication (NFC) or other tag associated with a vehicle (e.g., based on the location of the vehicle, or based on a user presenting the NFC tag to the charging station 105). A wireless transceiver associated with the charging station 105 can also detect a wireless transceiver of the electric vehicle 115. The charging station 105 can include a charging cable configured for connection to the electric vehicle 115. The connection of an electric vehicle 115 to the charging cable can result in a determination that the vehicle is located adjacent to the charger (e.g., is within a threshold range).

The threshold distance can be based on a sensitivity of the sensor (including transceivers, cables, or other components). For example, a wired or a wireless transceiver can have a maximum detection range, and the threshold distance can be maximum detection range. The threshold range can be measured based on additional granular data. For example, a detection of a wireless transceiver can determine a connection strength base on a transmit or receive power or other indication of a strength of signal received. For example, a WiFi network can determine a power level associated with a connection, such as about −45 decibel-mill watts (dBm). Such a level can be above or below a threshold. For example, a threshold of about −40 dBm or about −50 dBm. The threshold distance need not be a fixed radius surrounding the charger. For example, according to cable positioning, antennae orientation, sensor or source directionality, and the like, the threshold can vary between directions, or according to environmental conditions.

The electric vehicle 115 can have at least one token. The token can be unique to the electric vehicle 115, such as a vehicle identification number (VIN). The token can be a cryptographic key which is generated by the vehicle, or provisioned to the electric vehicle 115. The token can also be another credential set, such as a username or password associated with a user account. The vehicle can generate a single use token based on a cryptographic key. For example, the token can include a salt or hash of a secret the vehicle does not share with a counterpart network device (e.g., with the charging station 105), and can be further based on a date, a received message from a party wishing to authenticate, etc. Such a salt or hash can enable the identity of the electric vehicle 115 to be confirmed without transmitting the secret. The server 110, the charging station 105, and other devices can all contain similar keys, which can be exchanged, or otherwise processed as a part of a symmetric authentication or as a part of asymmetric authentication. For example, the server 110, the charging station 105, or another device (e.g., a mobile device of a user associated with the electric vehicle 115) can all possess a token which is verified by a certificate authority. Additional network devices can encrypt a message based on a related token, and the device can verify holding the verified token by providing decrypting the message.

The charging station 105 can establish a network connection with the electric vehicle 115. For example, the connection can be an association as a WiFi client. The charging station 105 can send or receive any of a probe request, an authentication request or an association request to establish such a network. Other networks can be established with similar processes. For example, a Bluetooth network can be established based on a page command. Some networks can include a physical connection. For example, the network can be formed by connecting a charging cable between the electric vehicle 115 and the charging station 105.

Wired connections can also require the exchange of a token. For example, a connected vehicle can provide a token to the charging station 105 to identify the vehicle to the charging station 105. The charging station 105 can provide the user with a token such an electric vehicle 115 supply equipment identification (EVSE ID). The unique identifiers or additional information shared through the communication channel can allow the electric vehicle 115 and the charger to form an additional network connection. The additional network can be more secure, offer a higher data rate, or offer connectivity to additional nodes. Many networks have various levels of trust or authentication (e.g., sequential steps of establishing a connection, or optional levels of verifications). As referred to herein, these may be referred to as different networks. For example, a first network connection can be an ad hoc network formed between at least two nodes such that a service set identifier (SSID) can be shared. A second network connection can be formed between the same two nodes following a transfer of authentication credentials. A third network connection can be formed between any two nodes over a Bluetooth connection, and a fourth network connection can be formed over a copper cable joining the two nodes.

The charging station 105 can encrypt the communication channel based on the token. An authentication scheme can include one or more devices inherently requesting another device (e.g., for a limited purpose). The electric vehicle 115 can implicitly trust a vehicle which is attached thereto to initiate an initial connection, which may allow device interactions including charging or establishing another connection with a higher level of trust. For example, the electric vehicle 115 can implicitly trust the receipt of a message from a charging station 105 to forward a request to a server 110, and upon an affirmative response from the server 110, can elevate a level of trust with the charging station 105. Encrypting the communications channel can be performed by securing the channel itself, or by securing the transmitted data. For example, if a file is encrypted based on a shared secret which only the electric vehicle 115 and the server 110 possess, sending the encrypted file over an open, unsecured network can be effective to encrypt the communications channel (e.g., the channel is not limited to a particular network technology).

The charging station 105 can convey data via the electric vehicle 115 to a server 110. The data can also be conveyed by transmitting the data to the electric vehicle 115, for retransmission to the server 110. In a remote location, such as a national park, this can allow the conveyance of data to the server 110 even if neither the vehicle nor the charging station 105 have connectivity when the vehicle is within the threshold distance of the charging station 105. For example, the vehicle could convey the data later that day or week, upon the return to a trailhead having network connectivity (e.g., cellular or WiFi connectivity). Such a transmittal may include one or more transmissions, which can continue into perpetuity, based on a time limit or transmission limit, or upon the receipt, by the charging station 105 of an acknowledgement (e.g., an acknowledgement from the same or another electric vehicle 115, or mobile device).

The data to be conveyed to the server 110 can be encrypted for transfer, based on a shared secret between the charging station 105 and a server 110. For example, the shared secret can be an encryption key which may also allow a recipient of the data to decrypt the data. Additional keys can also be included. For example, the server 110 can have access to a private key, and the vehicle can have access to a public key associated with the private key. This asymmetric combination can allow many network devices to encrypt a data file which can then by decrypted by the server 110. For example, the charging station 105 the electric vehicle 115, and a mobile device associated with the electric vehicle 115 can all have stored thereupon a public key associated with a private key of the server 110. Each of the devices can contain confidential information to be shared with the server 110 (e.g., the charging station 105 can include credit card information for one or more users of the charging station 105, the vehicle or mobile device can include profile information such as location, a home address, or a pin.) Any of the charging station 105, the electric vehicle 115, or the mobile device can thus transfer private data, encrypted with the private key, to the server 110.

A device other than the sending device can also encrypt the data. For example, a private key of an electric vehicle 115 can be expired, and a charging station 105 can contain a current version of the key. The electric vehicle 115 can transfer certain data (e.g., vehicle prognostic data) to the charging station 105 for encryption and forwarding to the servers 110, or may receive an updated public key from the charging station 105. A network device can send all available information, or can select a portion of information based on a level of trust established. For example, a first level of trust can be associated with the server 110 itself. (e.g., based on a pre-provisioned shared secret common to the server 110 and another network device). A second level of trust can be associated with a valid signed key received from another network device, and a third level of trust can be associated with additional open networks. Data can be provided or withheld based on a level of trust.

The charging station 105 and the server 110 can form a tunnel therebetween which includes the hardware of the electric vehicle 115 (e.g., sim profile data, or wireless transceiver). For example, the tunnel can be a virtual private network (VPN), a secure socket shell (SSH), or a telnet session. Many tunnels can be encrypted, which can be based on credentials or other tokens, for example, tunnels can be encrypted based on an encryption key. An encrypted channel can allow the charging station 105 to communicate with the server 110 securely, and to logically (e.g., at upper levels of a hardware or software stack) communicate directly with the server 110, despite the communication physically (e.g., at lower levels of a hardware or software stack) being conveyed through a transceiver or other component of another device, such as the electric vehicle 115. Any of the data discussed herein can be transferred to or from the server 110 via the tunnel. If the tunnel is hosted by a hardware or software component of an additional network device, that device is conveying the data to or from the server 110.

The examples disclosed herein are intended to be illustrative, and not to limit the scope of this disclosure. Any device connecting to a network 120 can perform various additional operations described herein. For example, although a charging station 105 can cause an electric vehicle 115 to communicate with a server 110, the perspective can also be reversed, and an electric vehicle 115 can make use of a charging station 105 to transmit vehicle data by the systems and methods described herein.

Further, the disclosure provided herein can also be practiced by a first and second charging station 105, or by a first and second electric vehicle 115, or to include a mobile device associated with an electric vehicle 115 (e.g., a mobile device having a mobile application installed thereupon, wherein the mobile application contains application data associating the mobile device with the electric vehicle 115 or the charger.) Although certain references have been made regarding a unique identifier, token, credentials, etc. of the electrical vehicle, or the charging station 105, various additional devices such as a mobile devices can also have one or more associated identifiers, which can be unique identifiers. For example, a mobile application can contain a MAC address, an advertiser ID, an international mobile equipment identity (IMEI), or a VIN, or customer ID (e.g., in application data of an application associated with the electric vehicle 115). An electric vehicle 115 or charging station 105 can also be associated with a unique identifier such as a MAC or IMEI address or an EVSE. Further, unless otherwise stated, the vehicle and charging station 105 are not required to engage in charging to perform the various network operations described. For example, a first electric vehicle 115 can be receiving power from a charging station 105, and a second electric vehicle 115 can be disposed within a threshold distance. The charging station 105 can perform many of the methods disclosed herein with the second vehicle, regardless of whether the second vehicle receives a charge from the charging station 105. Such a connection can increase a diversity of the respective antennae of the various network devices.

Figure 2:
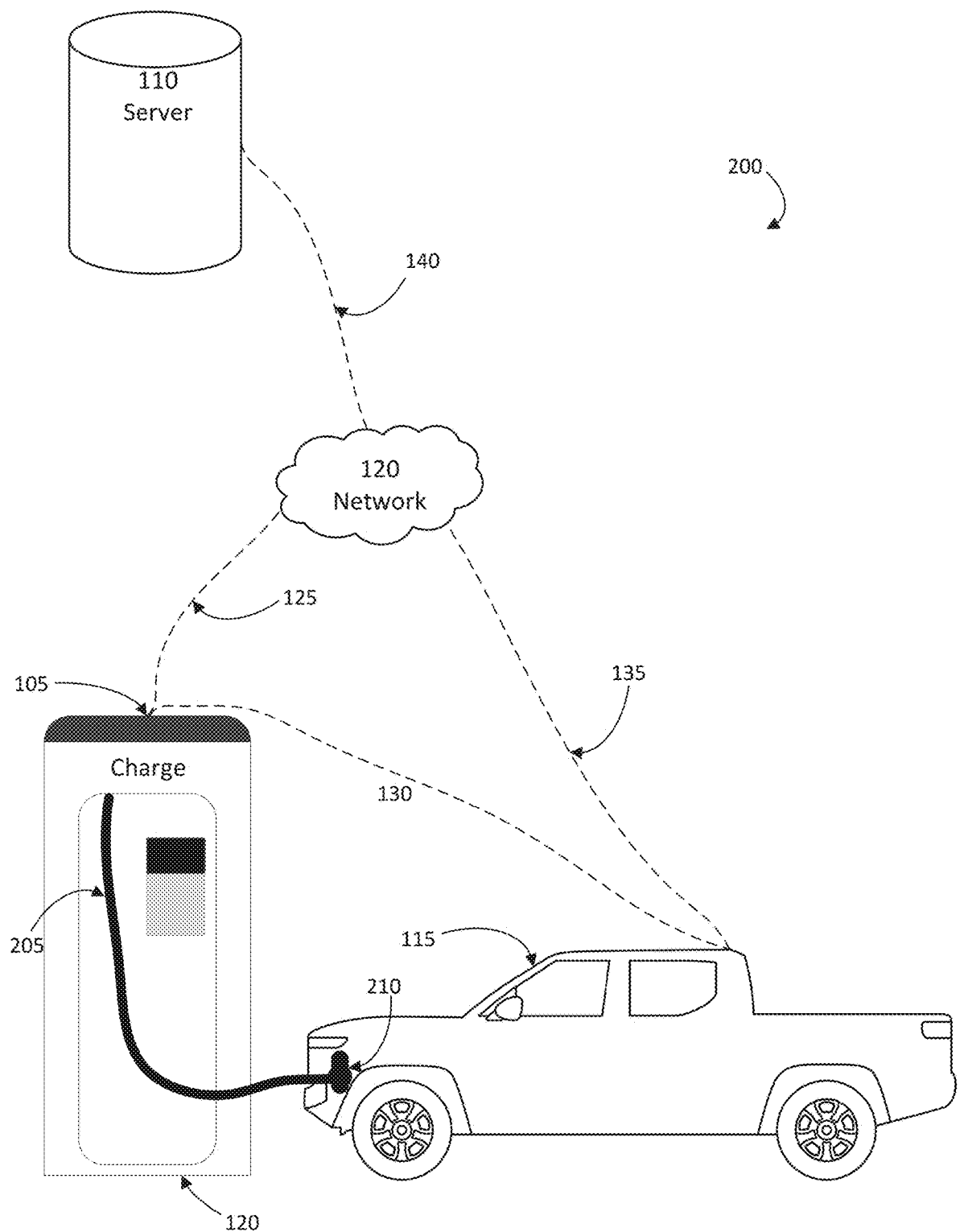
FIG. 2 also depicts system to provide wireless connection for electric vehicle chargers, in accordance with some aspects.

FIG. 2 also depicts a system 200 to provide wireless connection for electric vehicle chargers, in accordance with some aspects. The charging station 105 can include a charging cable 205 having a plug 210 to provide energy to (e.g., charge) a battery of an electric vehicle 115 (e.g., a charge plug 210). The plug 210 can connect to a receptacle of the electric vehicle 115, and can include power or data pins. Some power pins and data pins share a physical pin. Plugs 210 can include alternating current (AC) or direct current (DC) power to a vehicle. For example, various plugs 210 are defined by the IEC 62196 and SAE J1772 standards. Charging stations 105 can charge at one or more rates, such as by varying the current or voltage supplied, and can include a handshaking protocol (e.g., implemented over data pins or with pull up/pull down components) to determine an initial charging speed. Additional information can be exchanged over the plug 210 or other connections. For example, an electric vehicle 115 can have an associated account, and the charging station 105 behavior can vary according to that account. For example, a vehicle can be entitled (e.g., during a trial phase) to no cost charging, and that account status can be received or verified. The charger can verify the state of an account (e.g., verify a provision of payment information) prior to charging the vehicle. The energy supplied to a vehicle can also be based on a user preference. For example, a user preference can indicate that a maximum charging rate or a maximum state of charge be observed by the charger (e.g., to manage the aging characteristics of certain batteries).

Certificates or identifiers can be presented via the plug 210. For example, the charging station 105 and the electric vehicle 115 can each have a certificate which can be exchanged according to a standard method (e.g., according to various methods disclosed by ISO 15118). Additional communication (e.g., via reserved messaging, out of bounds communication, etc.) can exchange additional data between an electric vehicle 115 and a charging station 105. For example, a manufacturer or a consortium can supplement existing standards or generate new standards. A third party provider can receive or transmit interconnection or energy delivery information such as via an API. In addition to the charging cable 205 having a plug 210, data can be exchanged via a credit card terminal, and user input devices, a Bluetooth, NFC, or WiFi connection via various mobile devices, or by additional transceivers (e.g., wireless transceivers) comprising or otherwise associated with the electric vehicle 115. The certificates or identifiers can be unique to the particular vehicle, or can be representative of a model, manufacturer, or support for a relevant feature.

The charging station 105 can collect data associated with energy delivered to the electric vehicle 115 (e.g., the charging). For example, the charging station 105 can collect data regarding the rate of charge of the battery, the total energy delivered, account information such as a unique identifier of the vehicle or payment information, a connection time or disconnection time, etc. The data can be associated with the vehicle, or the charger. For example, the data can include thermal information of various components such as batteries, relays, connections, and busses. The data can also include charge limiting events. For example, a charging station 105 can limit charge speed based on a maximum available power at a cluster of chargers, a temperature, or status of the vehicle or charger. For example, if a cluster of chargers includes a solar array and local battery, the state of the solar array or local battery can affect the charging speed (e.g., a cluster of four charging stations 105 can be limited to a maximum of 500 kW draw, and based on the state of the three other charging station 105, the charging station 105 can be limited to 167 kW).

The electric vehicle 115 or the charging station 105 can provide collected data to the server 110 including a quantity of energy delivered to the electric vehicle 115, and additional data such as a charging rate, time, a wait time, additional transaction information (e.g., payment information). Additional information such as prognostics or analytics associated with the electric vehicle 115 or the charging station 105 can also be provided. For example, a status of the electric vehicle 115 or charging station 105 can be included. If either of the electric vehicle 115 or the charging station 105 requires service, this can include an indication of service required, including any parts, tools, or equipment which can be needed for such a service. The advance provision of this information can enable a later service to accelerate a service time (e.g., of the electric vehicle 115 or the charging station 105) by providing the information to the user or a service technician, by prepositioning or initiating shipment of needed parts, or alerting a user or technician of a need for the service. Analysis of the prognostics or analytics can be performed on the electric vehicle 115, or on the server 110.

The charging station 105 (or another reviving node) can receive computer-executable instructions configured to be executed by a processor associated therewith e.g., (software operating updates). Such updates can be incremental (e.g., can receive only an update of a change from a previous version of instructions). Some updates can be complete. For example, in response to a status of a bootloader (e.g., a cyclic redundant check determining that a firmware value does not match an expected value) a complete update can be performed. The complete update can be performed over the network. For example, a component of a charging station 105 or electric vehicle 115, such as a power delivery system, can require a software update. The update can be revived over the network. A network update can be initiated by the server 110 or another device (e.g., can be pulled or pushed). For example, in the case of the CRC indicating a non-match, the update can be pulled by the device. If an event indicates a particular status code, or sequence or status codes, the server 110 can determine that an update is required to maintain reliable operation of the vehicle, and can push an update. A charging station 105 can be a commercial charging station 105 or a charging station 105 at a campsite, cabin, or home. In the case of a home charging station 105, a home network (e.g., WiFi) can provide connectivity for the vehicle, or the vehicle can provide connectivity for the home.

Figure 3:
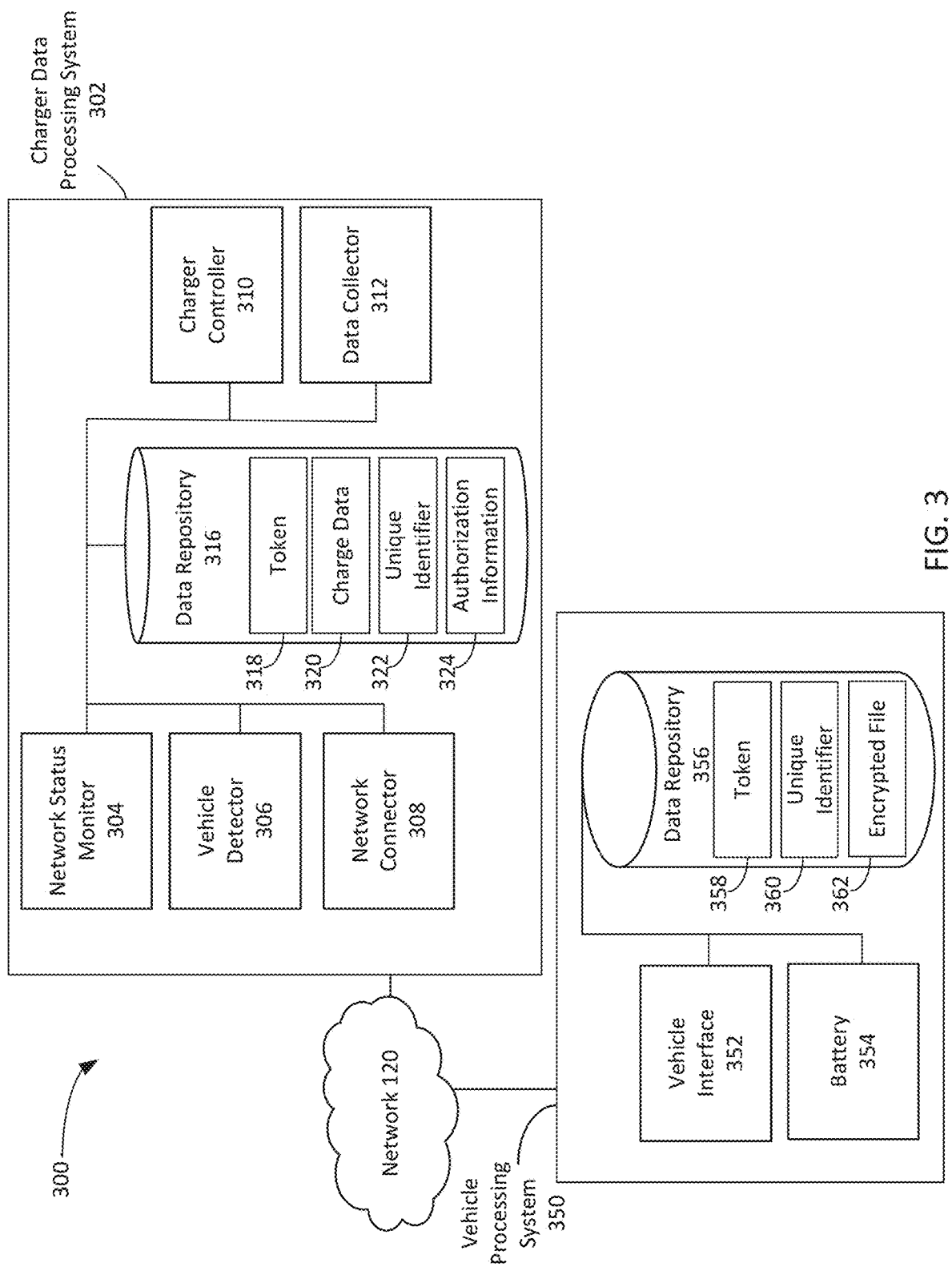
FIG. 3 depicts an example system to provide wireless connection for electric vehicle chargers, in some aspects.

FIG. 3 depicts an example system 300 to provide wireless network connections for electric vehicle chargers, in some aspects. The system 300 can include a charger data processing system 302 associated with a charging station (e.g., charging station 105 depicted in FIGS. 1-2). The system 300 can include, interface or otherwise access a vehicle processing system 350 of a vehicle (e.g., vehicle 115 depicted in FIGS. 1-2). The charger data processing system 302 can include one or more processors coupled to memory. The charger data processing system 302 can be a computing system such as a single board computer, a smartphone, a desktop computer, a cloud computing system, a server system, or any other type of mobile or stationary computer system. For example, the charger data processing system 302 can execute on one or more processors of the charging station 105 depicted in FIGS. 1-2, among others. The example system 300 can include at least one network 120. The network 120 can be, include, or be a component of the charger data processing system 302. For example, the charger data processing system 302 can include various wired or wireless connections joining components thereof, as well as additional components such as vehicles, servers, and additional data processing systems (not depicted), such as those associated with additional charging stations.

The charger data processing system 302 can include a network status monitor 304 designed, constructed, or operational to determine that a first network connection between the charging station and the one or more servers is unavailable. Unavailability can be associated with a state of the charging station, the server, the network 120 or additional components. Unavailability can be based on a determination that no connectivity is available (e.g., the failure of one or more pings, heartbeats, or watchdogs to be received or acknowledged). Unavailability can also be based on various network characteristics. For example, if a network bandwidth, cost, security level, or packet loss rate (or a combinatorial metric of multiple factors) exceeds or fails to meet a threshold, the network 120 can be deemed unavailable. Such an unavailability can be applicable to all transmissions or to a subset of transmissions. For example, data can be subdivided into high, medium, and low priority, (or according to another subdivision type, such as data containing personally identifiable information, payment account information, confidential data, etc.). Data can thusly be transmitted according to a data subset, such that a network 120 can be deemed available for some data subsets and unavailable for other data subsets.

The charger data processing system 302 can include a vehicle detector 306 designed, constructed, or operational to detect an electric vehicle within a threshold distance of the charging station. The vehicle detector 306 can include wired or wireless components to detect the presence of a vehicle. The vehicle detection can include vehicle information, such as a VIN, a network 120 or transceiver associated with the vehicle, or a charging capability of the vehicle. The vehicle detector 306 can infer the presence of a vehicle from a pressure applied to a sensor, or an interaction with a user or mobile device associated with the vehicle. The vehicle can be an electric vehicle having a token 318. The vehicle detector 306 can detect the presence of the token 318 such as to validate a vehicle identifier (e.g., a unique identifier 322, or an identifier of a manufacturer, adherence to a standard), can receive the token 318 of the vehicle, or can indicate the presence of the vehicle to another component of the charger data processing system 302 which can, in turn, receive or otherwise interact with the token 318.

The vehicle detector 306 can detect that the vehicle is within a threshold distance of the charging station. This threshold distance can be related to the maximum detection capability of the vehicle detector 306 (e.g., any detected vehicle can be within a threshold distance). The vehicle detector 306 can detect the vehicle within and beyond a threshold distance, and further discriminate between vehicles within the threshold distance and beyond the threshold distance. For example, the charging station can receive a wireless message comprising a vehicle location. The charging station can compare the received location to the charging station, or can determine a power level of a received or transmitted signal to estimate a range of the vehicle.

The threshold distance can be directionally selective. For example, the threshold distance can be directionally selective based on the orientation of an antennae, a location of a charging, cable, or a geo-fenced area. For example, the vehicle detector 306 can determine that a first vehicle which is determined to be 5 meters south of the charging station is within a threshold distance, and a second vehicle which is 5 meters north of the charging station is not within a threshold distance (e.g., based on a road direction, or the location of an additional charging station). The charging station can also communicate with additional charging stations to determine if a vehicle is within a threshold distance. For example, if a first vehicle communicates with a first charging station at a signal strength of −45 dBm, a second charging station can establish a threshold of less than −45 dBm (e.g., for the first vehicle or for all vehicles). The vehicle detector 306 can determine the electric vehicle is within the threshold distance based on a signal received from the electric vehicle and detected by a charge plug of the charging station. For example, the charge plug can contain a data pathway, or various pull up/pull down resistors to determine the presence of a vehicle. The charging station can infer that a vehicle is within a threshold distance based on the detection of said vehicle based on a power draw, the state of pull up/pull down resistors, or a communication over a data path of the plug.

The charger data processing system 302 can include a network connector 308 designed, constructed, or operational to establish a network connection between he charging station and the electric vehicle. For example, the network 120 can be established responsive to the unavailability determination and the detection of the electric vehicle within the threshold distance. The network connector 308 can include connections at various levels of the open systems interconnection (OSI) model. For example, a physical layer wired or wireless connection can be established. Various additional connections can be formed over the physical layer wired or wireless connection. For example, the connection can be configured to transmit various data collected by the charging station to the electric vehicle, or a server associated with the electric vehicle. For example, the network interface can establish various tunnels, or other paths for file transfer such as a file transfer protocol server or client.

The network connector 308 can transmit an authorization request and receive a reply. The authorization request and reply can be based on a preauthorization accessible to the charging station. For example, the authorization request can be directed to a look up table, and a pre-authorization can be determined based on the look up table. The authorization request can be for display to a user associated with the electric vehicle. For example, the user may not have preauthorized any requests, or a preauthorization may not be accessible to the charger data processing system 302 (e.g., can be stored on a server associated with the unavailable network connection 308). The user can have preauthorized a subset of requests, but a request may not be of an authorized subset. The display can include information regarding the transfer. For example, the authorization request can include a time estimate for a file transfer, or a file size of the transfer. The network connector 308 can provide this information to the vehicle interface 352, or can provide information from which the vehicle interface 352 can infer the information.

The network connector 308 can transmit an encrypted file to the electric vehicle. The network connector can include an encryption block capable of encrypting files, which can be transmitted to the electric vehicle along with a request to transfer the files to a server. For example, the server and the encryption block can share a secret (e.g., can store the same encryption key, or can share respective portions of a public/private key pair). The request to transfer the files can include an explicit request, or can be based on a predetermined file location, naming convention, or port. The network connector 308 can request to form a channel (e.g., a tunnel) between the charging station and the server, which uses at least one component of the electric vehicle (e.g., a wireless transceiver thereof), which can cause the electric vehicle to convey the file to the server. The tunnel or channel can be secured, such as by an SSH connection, a secure FTP connection, or a VPN.

The charging station can receive information via the network connector 308. For example, the network can include software updates, (e.g., computer-executable instructions configured to be executed by the one the one or more processors of the charging station), or other information including pricing information, parametric data such as updated vehicle lists, acknowledgements of successful or failed prior transmissions, heartbeats, pings, data requests (e.g., requesting information associated with the current or previous state of the device such as a maximum or current temperature or voltage, or a total power delivered to date). The various information received over the network connector 308 can be transmitted via the electric vehicle, or directly from to server.

The charger data processing system 302 can include a charge controller 310 designed, constructed, or operational to charge a battery 354 of the electric vehicle. The charge controller 310 can charge the electric vehicle via one or more charge plugs or inductive coils. For example, the charge controller can include various switching circuits (e.g., transistors, solid state relays, or electromechanical relays) which control the flow of electricity between the charger and an electric vehicle. The charge controller can determine a state of a battery 354 of the vehicle via a vehicle interface 352 of the vehicle. The charge controller can vary the applied current to the batteries. For example, the charge controller can apply a charging current based on the battery temperature and state of charge (e.g., in conjunction with the vehicle interface 352 which can include various battery sensors, and state tables).

The charger data processing system 302 can include a data collector 312 designed, constructed, or operational to collect data associated with energy delivered to the vehicle (e.g., charger data 320). For example, the state of the charging station, environmental conditions, connectivity, parametric data, pricing data, battery state of charge, and total energy delivered can all relate to the charging of the vehicle. Connectivity data (e.g., involving the charging station, the electric vehicle, the servers, and additional network nodes) can also be relevant to the charging of a vehicle.

The data collector 312 can store data on one or more memory devices (e.g., non-volatile or volatile memory devices) which can be, or comprise a data repository 316 of the charger data processing system 302. The data collector can transmit various data (e.g., via the network connector) to an electric vehicle, a remote server, or another network device, such as a mobile device associated with an electric vehicle or another component of the charger data processing system 302 such as the network connector 308.

The data repository 316 of the charger data processing system 302 can include various information. For example, a token 318 can be stored which can also serve as a unique identifier 322, or authorization credential/encryption keys. The token 318 can be stored in a read only memory (such as a write once memory), or can be configurable. For example, a data repository 316 of the charger data processing system 302 can store an EVSE ID or one or more network credentials or encryption keys. Such data can be stored in a ROM or in a non-volatile memory device. The data can host authorization information 324 which can include authorization to cause an electric vehicle to transmit information to a server as well as additional authorization information 324. For example, authorization information 324 can include transaction (e.g., payment) information associated with various electric vehicles or users, or can include charging authorization information 324. For example, if a vehicle is associated with free charging, or is authorized to charge at a specified rate (e.g., 400 kW), such information can be stored by the data repository 316 of the charger data processing system 302. Additional authorization information 324 can include a password or key associated with a user. For example, a technician can be associated with an identifier, which can be unique to the user, unique to the charging station, or be shared. The additional authorization information 324 can identify the access privileges of the technician, which can be varied according to an access control list.

The vehicle processing system 350 can be associated with an electric vehicle. For example, the vehicle processing system 350 can be or include components of an electric vehicle, such as various processors, transceivers, and memory devices. The vehicle processing system 350 can execute on one or more processors of vehicle 115 depicted in FIGS. 1-2, for example. The vehicle processing system 350 can also include additional components such as a mobile device associated with the electric vehicle or a cloud computing system. As discussed, the vehicle includes a vehicle interface 352 designed, constructed, or operational to interface with various components of the charger data processing system 302. The vehicle interface 352 can also include components to connect to a remote network device (e.g., a server). For example, the vehicle interface can include a wireless transceiver and a SIM card (e.g., an eSIM profile stored on a memory device). The battery 354 of the electric vehicle can be, or be included in a battery pack having various sensors, protection mechanisms, thermal management, etc. which can collect, or transmit further data (e.g., via the vehicle interface 352).

The vehicle processing system 350 can also include a data repository 356 including one or more memories communicatively coupled to one or more processors. The data repository 356 can include one or more tokens 358 (e.g., an identifier, or a secret, such as an encryption key, including a public key). The token 358 can be associated with the charger data processing system 302, such as a received EVSE, or can be associated with the electric vehicle, and can be associated with, or can be one or more unique identifiers 360 (e.g., a MAC address, a VIN, or a private key).

The data repository can store files, such as one or more encrypted files 362. The encrypted files 362 can be received from the charging station or server or intended for transfer to the charging station or server. For example, the encrypted file 362 can include data associated with charging the electric vehicle (or another electric vehicle), and intended for transfer to a server. The encrypted file 362 can include a software update, or other information intended for transfer to the charging station (e.g., via the network connector 308).

The vehicle processing system can include various additional components. For example, the vehicle processing system can include one or more components or perform one or more functions of the charger data processing system 302. As discussed with respect to FIG. 1, additional network devices can cause data to be conveyed to or from a server (e.g., an electric vehicle, or a mobile device associated with an electric vehicle). For example, a vehicle detector of a vehicle processing system 350 can also detect when a vehicle is within a threshold distance of a charging station. The vehicle detector 306 can detect the vehicle is within a threshold distance by detection of a plug or a wireless transceiver of the charging station.

Figure 4:
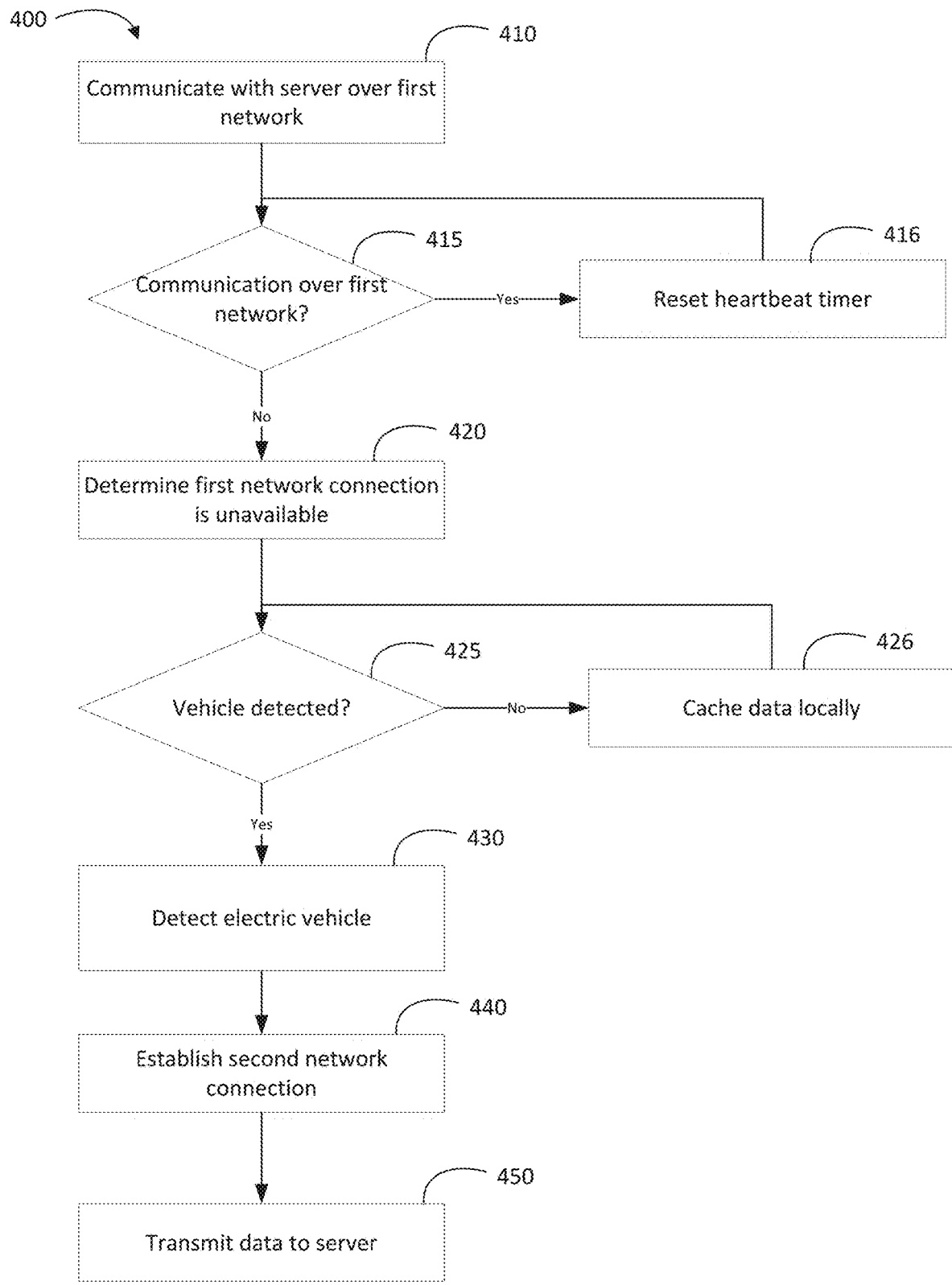
FIG. 4 depicts a method of providing wireless connection for electric vehicle chargers, in accordance with some aspects.

FIG. 4 depicts a method 400 to provide wireless connection for electric vehicle chargers, in accordance with some aspects. The method 400 can be performed by one or more component or system depicted in FIG. 1-3 or 6-8, including, for example, a charger data processing system 302, charger 105, vehicle processing system 350, vehicle 115, or server 110. In brief summary, at ACT 410, a charger data processing system of a charging station can communicate with a server over a first network. At ACT 415, a determination of communication over the network is made. At ACT 416, a heartbeat timer is reset. At ACT 420, a determination of unavailability of the network is made. At ACT 425, a determination of the presence of a vehicle is made. At ACT 426, data is cached locally. At ACT 430, an electric vehicle 115 is detected. At ACT 440, a second network connection is established. At ACT 450, data is transmitted to the server over the second network connection.

At ACT 410, a charging station communicates with a server over a first network. For example, the first network can be a cellular network, and the communication can involve regular periodic transmissions such as a heartbeat, as well as data in response to charging electric vehicles (e.g., time, charge delivered, and other data collected associated with charging a vehicle). The first network can be based on a transceiver of the charging station, or can be based on a transceiver of another electric vehicle or another network device. The charging station or the server can maintain a timer for communication, such that a loss of communication can be detected by the expiration of the timer. The timer can be reset for all communication, only for a specified heartbeat signal, or for another subset of transmission types at ACT 415. At ACT 416, upon communication with the server, the charging station or the server can reset a heartbeat timer. Upon an expiration of a timer associated with the heartbeat, the charging station can attempt further communication with the server. For example, the charging station can reattempt a finite number of times, or until a connection is reestablished. A server or charging station can provide a message of expected downtime in response to a maintenance event or other known downtime, which can avoid extraneous communications events and logging.

At ACT 420, the charging station determines that the first network connection is unavailable. Upon determining the first network connection is unavailable, the charging station can reduce a frequency of attempts to contact the server over the first communications channel, take remediative steps (e.g., varying network parameters such as wireless providers and communication bands or technologies, and initiating full or partial system resets), or log the indication of the error. The determination can also effect a change in the attempts to reestablish communication. For example, the charging station can make fewer attempts, halt logging of failed attempts or packets or otherwise alter behavior.

At ACT 425, the charging station attempts to detect an electric vehicle. If the charging station fails to detect an electric vehicle, the charging station can cache data locally. The locally cached data can be a complete copy of the information to be sent over the network, can contain additional information (e.g., general status information or information specific to the network outage), or can contain lesser information (e.g., low priority status messages such as heartbeat attempts may not be logged to minimize a log file size). The locally cached information can be stored in a finite buffer, which can cause the charging station to halt logging once a maximum file size is reached, which can ensure root cause data is contained in the log. If a file size is reached, the charger can continue operation but halt logging, or can halt operation. An electric charger can also cache data in a circular buffer (e.g., in which newer information displaces older information) which can allow the charging station to continue operation, but can risk a loss of data (e.g., payment information or data indicative of a fault). The detection of a vehicle can be via a wireless transceiver, a detection that a plug of the charging station is connected to an electric vehicle, or an indication from a user associated with the electric vehicle (e.g., via a user interface of the charging station, a mobile device of the user, etc.).

At ACT 430, the charging station detects the electric vehicle, such as by the attempted detection at ACT 425. Detection of the electric vehicle can include a detection of a vehicle presence or the detection or specific characteristics of a vehicle (e.g., a manufacturer, a network connectivity status, or a VIN).

At ACT 440, the charging station establishes a second network connection with the electric vehicle. The second network connection connects at least the charging station to the electric vehicle. The electric vehicle can also be connected to a backend network including the server, so that the charging station can communicate with the server via the electric vehicle. If the electric vehicle is not connected to the server (e.g., because the server is unavailable, because a common cellular network of the charging station and the electric vehicle is experiencing an outage) the charging station can await an electric vehicle having a connection, or can transfer the files to the electric vehicle for later transmission to the server, at another time or place. Upon receiving the data, the server can acknowledge such receipt by causing an acknowledgement to be delivered to the charging station (e.g., by sending directly, or via another network device).

Figure 5:
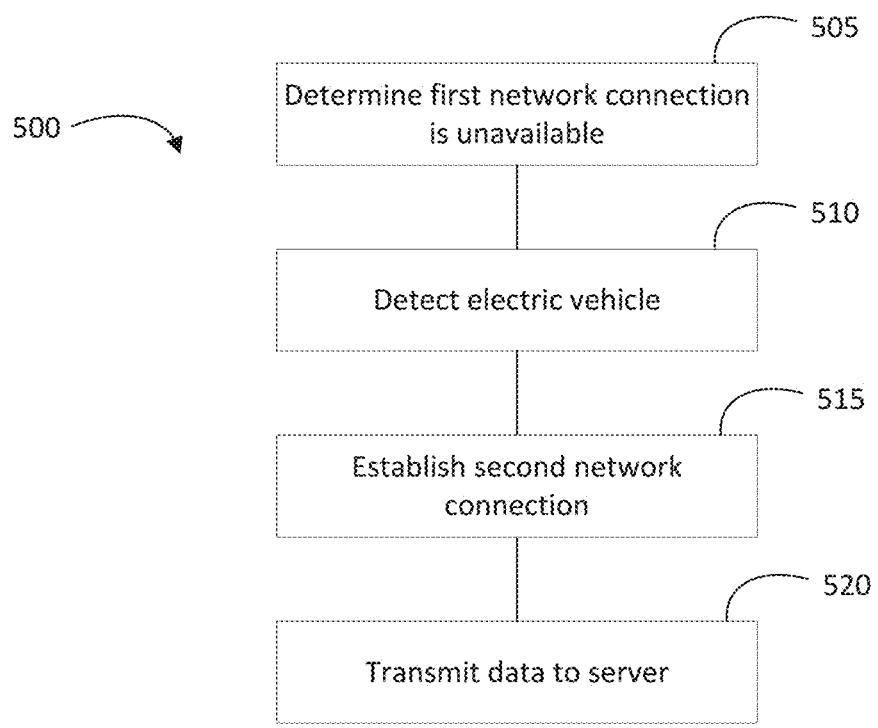
FIG. 5 also depicts method of providing wireless connection for electric vehicle chargers, in accordance with some aspects.

FIG. 5 depicts an example method 500 to provide wireless connection for electric vehicle chargers, in accordance with some aspects. A first network connection is deemed unavailable at ACT 505. The unavailability can be a result of a state of the charging station, or a network, or of an intermediate device. The unavailability can be determined based on a failure to establish a connection with a server, or based on the state of an established connection with a server. The unavailability can be established by the charging station, the server, or another network node.

At ACT 510 an electric vehicle is detected. The electric vehicle can be detected by a wired or wireless sensor. The detection of the electric vehicle can involve additional interrogation of the electric vehicle such as determining a manufacturer, compliance with a standard, or avoiding contention with additional charging stations. The detection of the electric vehicle can be based on a detection of a user, or device associated with the electric vehicle.

At ACT 515, a second network is established comprising the electric vehicle. At ACT 520, data is transmitted to a server. The second network can be of a different type or a different security level than the first network connection, or can be similar. For example, the first and second networks can be cellular networks of the same carrier, channel, or band. The second network can comprise any portion of the charging station or the electric vehicle. For example, the second network can rely on any of a SIM profile, or wireless transceiver to establish the second network. Establishing the second network can be or include establishing a connection to an existing network. Operation of the disclosed method 500 can be similar to other ACTs depicted herein. For example, the various ACTs of method 500 can be similar to ACTs of method 400, with various substitutions, omissions and additions as are depicted herein.

Figure 6:
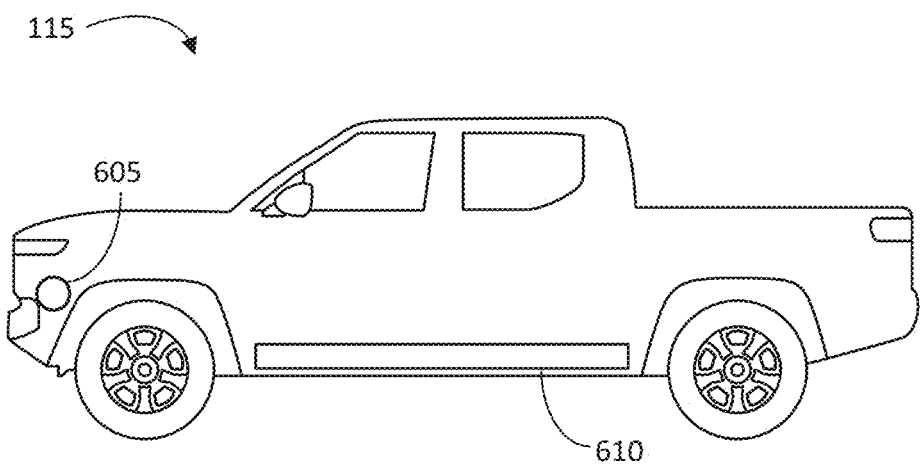
FIG. 6 depicts a general context of vehicle systems, in accordance with some aspects.

FIG. 6 depicts a general context of vehicle systems, in accordance with some aspects. An electric vehicle 115 has a charging receptacle configured to receive a plug. As used herein, plug and receptacle are intended merely to differentiate between connectors, and are not intended to convey information regarding a power source/sink, a data source/sink, or the shape of electrical terminators such as pins or sockets. For example, the receptacle can sink power for storage at least one battery 610 (or associated battery pack), or source power from the battery. The battery can power various systems of the electric vehicle 115. For example, the battery 610 can power a propulsion subsystem, a network subsystem, and an infotainment subsystem.

The network subsystem can include one or more wireless transceivers. For example, the transceivers can be configured to communicate over cellular, WiFi, Bluetooth, satellite or other networks. The transceivers of the network subsystem can collectively, or individually, connect to one or more additional nodes at a time. For example, a network system can connect to the charging station, to the server, and to an additional network, such as a mapping service simultaneously. The network subsystem can manage an available bandwidth between the various devices, for example, the network subsystem can ensure a particular quality of service of streaming audio, and transfer data needed to update a charger on a best effort basis, which can improve a user experience while transferring data. The data transfer can be prioritized which can reduce a user must wait. Such decisions can be responsive to as user preference or to a predicted electric vehicle charge time. Similarly, if vehicle data is being passed to a server by a charging station, the content of the vehicle can by limited (e.g., some content can be blocked, filtered, or deprioritized). For example, a streaming video from the vehicle can be filtered or deprioritized relative to vehicle logs, software updates, or other information.

The infotainment (entertainment and information) subsystem can include a display, and at least one user input. The user interface can be integrated into the display (e.g., a touchscreen or LEDs), or can be a separate control, such as a button. The infotainment subsystem can be communicatively coupled to the network subsystem such that data, web pages, streaming audio or video or vehicle related data can be displayed to a user via the infotainment system including audio, visual, and haptic information, including various prompts. Selections of the infotainment subsystem can be mirrored on a mobile device, and vice versa.

Figure 7:
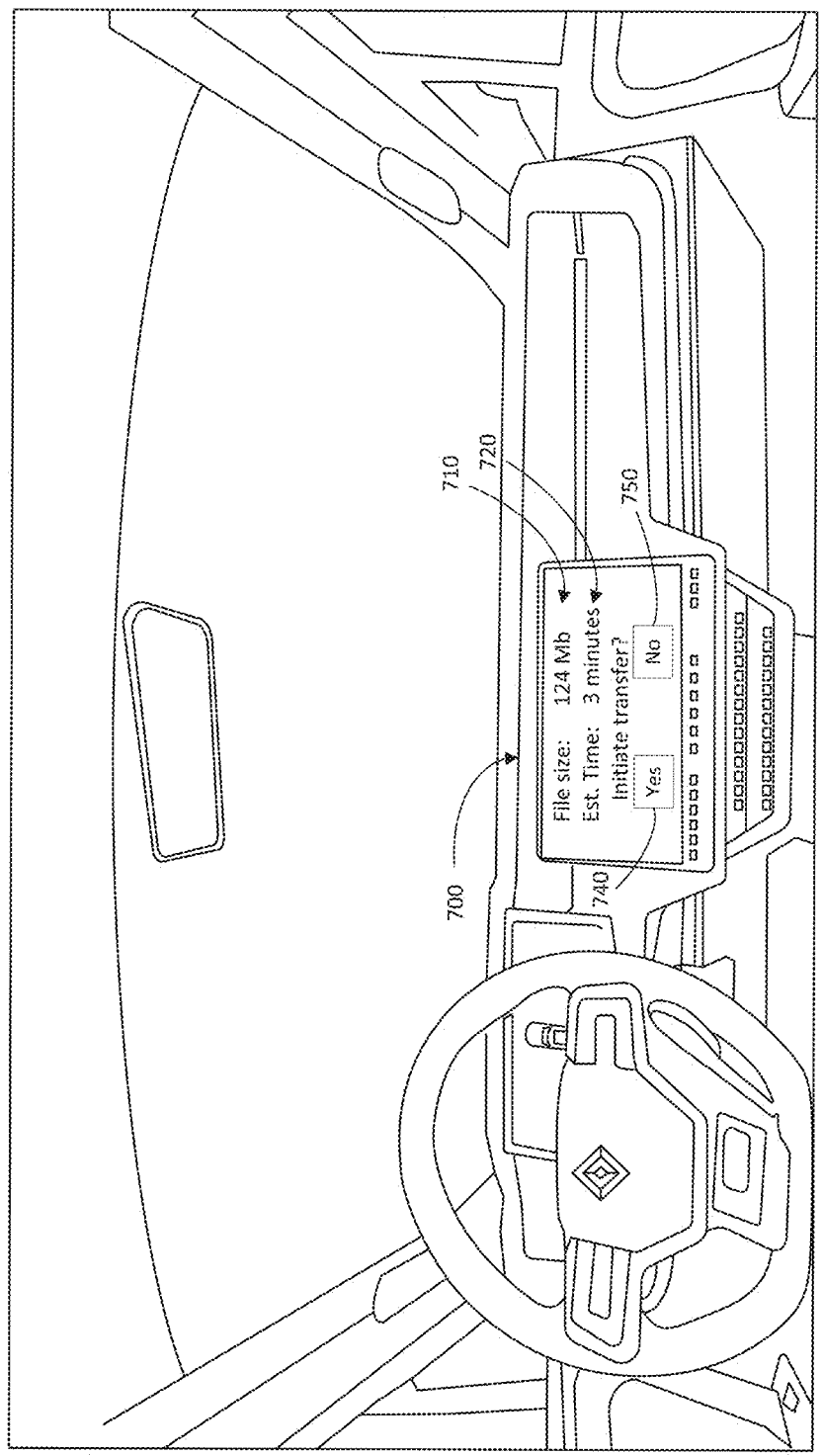
FIG. 7 depicts a graphical user interface, in accordance with some aspects.

FIG. 7 depicts a graphical user interface 700, in accordance with some aspects. The graphical user interface 700 can be provided by one or more system or component depicted in FIG. 1-3 or 8, including, for example, a vehicle processing system. The user interface 700 can depict an authorization message displayed to a user. The authorization message can include related data such as a file size 710 and estimated transfer time 720. The file size 710 and estimated transfer time 720 can be static, or dynamically updated during the course of a transfer. User selections to accept 740 or reject 750 the transfer can be displayed via the user interface 700. The vehicle processing system can display, via the user interface 700, information such as the security used to protect data, whether any personally identifiable information is included in the data, a consequence of failing to transfer the data. The data can be categorized (e.g., as high, medium, and low priority). User selections can preselect any of the options. For example, high priority transfers can be preselected to be accepted, low priority transfers can be preselected to be denied, and medium priority transfers can be preselected to be displayed to the user.

The charging station can transmit an authorization request to a user associated with the electric vehicle. For example, the authorization request can be an authorization to transmit or receive data over the transceiver of the electric vehicle or mobile device of the user. The request can be based on one or more user preferences. For example, a user preference can be selected to approve all requests, approve requests based on pre-defined criteria (e.g., a maximum file size 710, or a maximum transfer time), or display all requests to a user. A user can pre-authorize a transfer (e.g., based on an acceptance of terms and condition, or a selectable user option. A preauthorization can be made available to the charging station through the network of the electric vehicle. The electric vehicle can share network data with the charging station. For example, the electric vehicle can share an indication of network connection (e.g., no network connection, poor signal, good signal, etc.). The server can maintain a record of various authorization requests or uploads, which may not apply towards any applicable user data caps or records. For example, if a user approves an authorization request, and transfers a 1 GB file via a cellular device, the 1 GB can be associated with the charging station rather than the electric vehicle.

The authorization request can include additional information. For example, the authorization request can include an indication that the charging station will not be operable, absent the data transfer, (e.g., in the case of a mandatory software update of the charging station 105, which must be downloaded via the network). The request can include an indication of a file size 710 or time 720. For example, if a file to be uploaded/downloaded across the network, a time 720 can be estimated based on network speed and file size 710.

The authorization request can be displayed on a GUI of the electric vehicle, or associated with the electric vehicle (e.g., on a mobile device associated with the vehicle). For example, the request itself as well as the additional information can be displayed. The request can be a notification (e.g., for pre-authorized transfers), or can include user prompts, such as accept, deny, or more information selections. A prompt may be displayed at any time (e.g., at initial delivery of a vehicle, or subsequent to a detection of the vehicle and prior to transmitting the data collected by the vehicle) For example, a user can be presented with additional information as to the transfer. For example, if a charging station will be unavailable until the charger is updated, the user can elect to accept the transfer. A user can be presented with an estimated transfer time 720, and can delay charging or proceed to another charger, and thus can elect not to initiate the transfer. Such authorization can be provided for both for receiving and sending information. For example, certain information can be subject to various regulatory requirements, and the display to the user can include information relevant to those requirements. The display of some such information can be based on the user profile (e.g., home address), or vehicle location (e.g. as determined by a global positioning system).

The charging station can receive an approval in response to the authorization request. The approval can be manually entered by a user of the electric vehicle, or can be automated (e.g., based on a previous authorization). The charging station can store a user authorization code. For example, an authorization approval can include the transfer of a token to the charging station. Upon an authorization approval, the charging station can initiate a transfer to or from the server as described herein, such as by encrypting files, or opening a logical tunnel with the server 110 to conduct the transfer.

Figure 8:
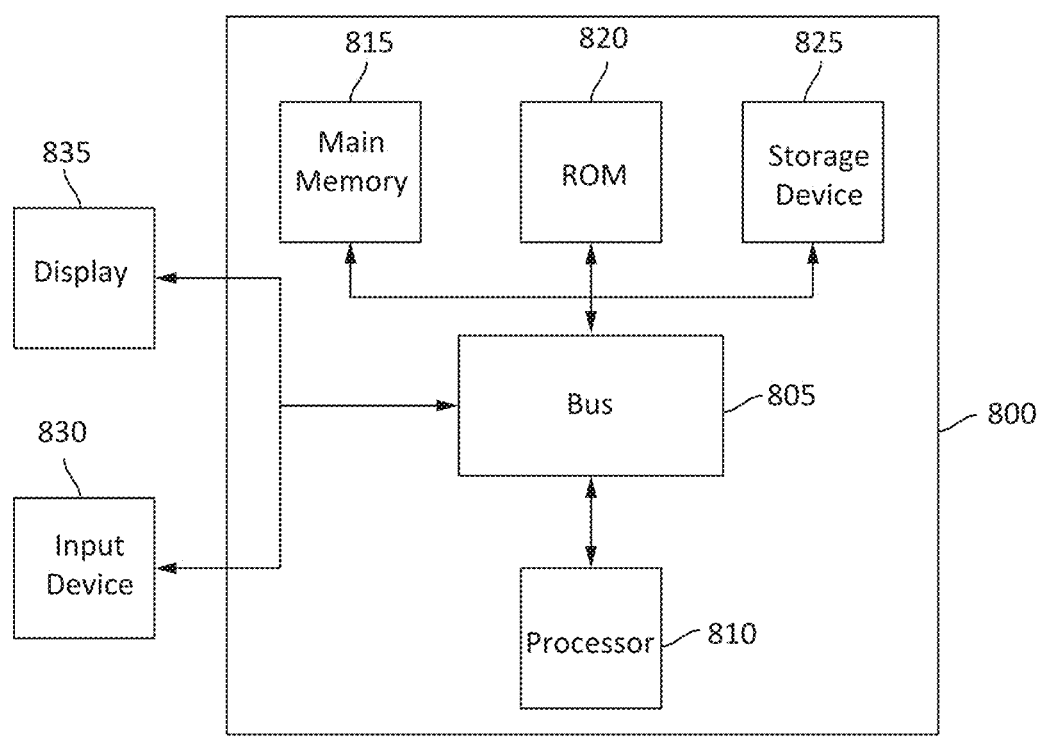
FIG. 8 is a block diagram illustrating an architecture for a computer system that can be employed to implement elements of the systems and methods described and illustrated herein.

FIG. 8 depicts an example block diagram of an example computer system 800. The computer system or computing device 800 can include or be used to implement a data processing system or its components. For example, the computing device 800, or one or more components thereof, can be used to implement the charger data processing system 302 or vehicle processing system 350. The computing system 800 includes at least one bus 805 or other communication component for communicating information and at least one processor 810 or processing circuit coupled to the bus 805 for processing information. The computing system 800 can also include one or more processors 810 or processing circuits coupled to the bus for processing information. The computing system 800 also includes at least one main memory 815, such as a random access memory (RAM) or other dynamic storage device, coupled to the bus 805 for storing information, and instructions to be executed by the processor 810. The main memory 815 can be used for storing information during execution of instructions by the processor 810. The computing system 800 can further include at least one read only memory (ROM) 820 or other static storage device coupled to the bus 805 for storing static information and instructions for the processor 810. A storage device 825, such as a solid state device, magnetic disk or optical disk, can be coupled to the bus 805 to persistently store information and instructions.

The computing system 800 can be coupled via the bus 805 to a display 835, such as a liquid crystal display, or active matrix display, for displaying information to a user such as a driver of the electric vehicle 115 or other end user. An input device 830, such as a keyboard or voice interface can be coupled to the bus 805 for communicating information and commands to the processor 810. The input device 830 can include a touch screen display 835. The input device 830 can also include a cursor control, such as a mouse, a trackball, or cursor direction keys, for communicating direction information and command selections to the processor 810 and for controlling cursor movement on the display 835.

The processes, systems and methods described herein can be implemented by the computing system 800 in response to the processor 810 executing an arrangement of instructions contained in main memory 815. Such instructions can be read into main memory 815 from another computer-readable medium, such as the storage device 825. Execution of the arrangement of instructions contained in main memory 815 causes the computing system 800 to perform the illustrative processes described herein. One or more processors in a multi-processing arrangement can also be employed to execute the instructions contained in main memory 815. Hard-wired circuitry can be used in place of or in combination with software instructions together with the systems and methods described herein. Systems and methods described herein are not limited to any specific combination of hardware circuitry and software.

Although an example computing system has been described in FIG. 8, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server 110, or that includes a middleware component, e.g., an application server 110, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics can be reversed. For example, charging a battery can include vehicle to grid or vehicle to home transfers. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a charging station, comprising one or more processors coupled to memory, the charging station configured to:
determine that a first network connection between the charging station and one or more servers is unavailable;
detect an electric vehicle having a token, the electric vehicle within a threshold distance of the charging station; and
establish, responsive to the determination that the first network connection is unavailable and the detection of the electric vehicle within the threshold distance, a second network connection between the charging station and the electric vehicle encrypted based at least in part on the token provided by the electric vehicle.

2. The system of claim 1, comprising the charging station to:
charge, via a charge plug of the electric vehicle, a battery of the electric vehicle;
transmit, via the second network connection, data collected by the charging station to cause the electric vehicle to provide the data to the one or more servers; and
collect second data associated with energy delivered to the electric vehicle by the charging station.

3. The system of claim 1, comprising the charging station to:
transmit an authorization request to display from a user interface associated with the electric vehicle; and
receive an authorization approval responsive to the authorization request.

4. The system of claim 3, comprising the charging station to:
transmit, via the second network connection, data collected by the charging station to cause the electric vehicle to provide the data to the one or more servers;
wherein the authorization request is transmitted for display via a graphical user interface of the electric vehicle subsequent to the detection of the electric vehicle, and prior to transmission of the data collected by the charging station.

5. The system of claim 3, wherein the authorization request comprises at least one of a time estimate for a file transfer, or a file size, for display from the user interface.

6. The system of claim 1, wherein the token comprises a unique identifier associated with the electric vehicle.

7. The system of claim 1, comprising:
the charging station to determine the electric vehicle is within the threshold distance based on a strength of signal received from the electric vehicle and detected by a wireless transceiver of the charging station.

8. The system of claim 1, comprising:
the charging station to determine the electric vehicle is within the threshold distance based on a signal received from the electric vehicle and detected by a charge plug of the charging station.

9. The system of claim 1, comprising the charging station to:
transmit an encrypted file to the electric vehicle, wherein the encrypted file is accessible by a shared secret between the charging station and the one or more servers; and
request the electric vehicle to transfer the encrypted file to the one or more servers.

10. The system of claim 1, comprising the charging station to:
transmit, via the second network connection, data collected by the charging station to cause the electric vehicle to provide the data to the one or more servers;
establish a logical tunnel between the charging station and the one or more servers comprising a wireless transceiver of the electric vehicle; and
transmit the data to the one or more servers over the logical tunnel.

11. The system of claim 1, comprising the charging station to:
receive, over the second network connection, computer-executable instructions configured to be executed by the one the one or more processors of the charging station.

12. The system of claim 1, comprising the charging station to:
transmit, via the second network connection, data collected by the charging station to cause the electric vehicle to provide the data to the one or more servers;
wherein the data collected by the charging station comprises a quantity of energy delivered to the electric vehicle.

13. A method, comprising:
determining, by a charging station, that a first network connection between the charging station and one or more servers is unavailable;
detecting, by the charging station, an electric vehicle having a token within a threshold distance of the charging station; and
establishing, by the charging station, responsive to the determination that the first network connection is unavailable and the detection of the electric vehicle within the threshold distance, a second network connection between the charging station and the electric vehicle encrypted based at least in part on the token provided by the electric vehicle.

14. The method of claim 13 comprising:
charging, by the charging station, via a charge plug associated with the electric vehicle, a battery of the electric vehicle;
transmitting, via the second network connection, data collected by the charging station to cause the electric vehicle to provide the data to the one or more servers; and
collecting, by the charging station, second data associated with the charging of the electric vehicle.

15. The method of claim 13 comprising:
transmitting, by the charging station, an authorization request to display from a user interface associated with the electric vehicle; and
receiving, by the charging station, an authorization approval responsive to the authorization request.

16. The method of claim 15 comprising:
transmitting, via the second network connection, data collected by the charging station to cause the electric vehicle to provide the data to the one or more servers;
wherein the authorization request is transmitted for display from the user interface via a graphical user interface of the electric vehicle subsequent to the detection of the electric vehicle, and prior to transmitting the data collected by the charging station.

17. A system, comprising:
an electric vehicle, comprising one or more processors coupled to memory, having a first token, the electric vehicle configured to:
determine that a first network connection between the electric vehicle and one or more servers is unavailable;
detect a charging station within a threshold distance of the electric vehicle;
provide, by the electric vehicle, the first token to the charging station;
establish, responsive to the determination that the first network connection is unavailable and the detection of the charging station within the threshold distance, a second network connection between the electric vehicle and the charging station encrypted based at least in part on the first token provided by the charging station; and
transmit, via the second network connection, data collected by the electric vehicle to cause the charging station to provide the data to the one or more servers.

18. The system of claim 17, comprising the electric vehicle configured to:
receive an authorization request to display from a user interface associated with the electric vehicle; and
transmit an authorization approval responsive to the authorization request.

19. The system of claim 18, comprising the electric vehicle configured to:
display, via a graphical user interface, the authorization request associated with the electric vehicle subsequent to the detection of the charging station and prior to transmitting the data collected by the electric vehicle.

20. The system of claim 17, comprising the electric vehicle configured to:
receive a second token from the charging station, the second token comprising a unique identifier associated with the charging station.

\* \* \* \* \*